US008812056B2

(12) United States Patent
Higginbotham

(10) Patent No.: US 8,812,056 B2
(45) Date of Patent: Aug. 19, 2014

(54) VOICE-BASED COMMAND DRIVEN COMPUTER IMPLEMENTED METHOD

(76) Inventor: Christopher D. Higginbotham, Delaplane, VA (US)

( * ) Notice: Subject to any disclaimer, the term of this patent is extended or adjusted under 35 U.S.C. 154(b) by 233 days.

(21) Appl. No.: 13/026,199

(22) Filed: Feb. 11, 2011

(65) Prior Publication Data
US 2011/0201385 A1 Aug. 18, 2011

Related U.S. Application Data

(60) Provisional application No. 61/303,771, filed on Feb. 12, 2010.

(51) Int. Cl.
*H04B 1/38* (2006.01)
*G10L 15/26* (2006.01)
*G10L 13/04* (2013.01)

(52) U.S. Cl.
CPC ............ *G10L 15/265* (2013.01); *G10L 13/043* (2013.01)
USPC ........................................................ 455/563

(58) Field of Classification Search
USPC ........................................................ 455/563
See application file for complete search history.

(56) References Cited

U.S. PATENT DOCUMENTS

| | | | |
|---|---|---|---|
| 6,621,892 B1 * | 9/2003 | Banister et al. ............ | 379/88.14 |
| 6,868,142 B2 * | 3/2005 | Gupta et al. ............... | 379/88.04 |
| 6,928,614 B1 * | 8/2005 | Everhart ..................... | 715/728 |
| 7,295,660 B1 | 11/2007 | Higginbotham et al. | |
| 8,451,101 B2 * | 5/2013 | Somasundaram et al. ............................ | 340/286.07 |
| 2005/0038650 A1 * | 2/2005 | Bellegarda et al. .......... | 704/231 |
| 2007/0198273 A1 * | 8/2007 | Hennecke .................... | 704/277 |
| 2010/0005149 A1 * | 1/2010 | Yu .............................. | 709/206 |
| 2010/0106705 A1 * | 4/2010 | Rush et al. ................. | 707/709 |
| 2010/0141662 A1 * | 6/2010 | Storey et al. ............... | 345/473 |
| 2011/0035220 A1 * | 2/2011 | Opaluch ...................... | 704/246 |

* cited by examiner

*Primary Examiner* — Patrick Edouard
*Assistant Examiner* — Shantell L Heiber
(74) *Attorney, Agent, or Firm* — Patterson & Sheridan, LLP

(57) ABSTRACT

The present invention generally relates to a voice-based command driven computer implemented method and programmed apparatus that allows a user to easily add any open API communication product they choose to one interface. The computer implemented method filters all electronic communications selected by the user through a common source, such as the user's cell phone or computer. Each time an electronic communication is received, no matter through what program or application, the computer implemented method operates to communicate to the user that the electronic communication has been received and provides the user with the option of listening to and responding to the electronic communication, if appropriate. The user responds to the electronic communication through voice-based communication rather than physical interaction with the common source. The user may additionally initiate electronic communication through voice-based communication.

5 Claims, 1 Drawing Sheet

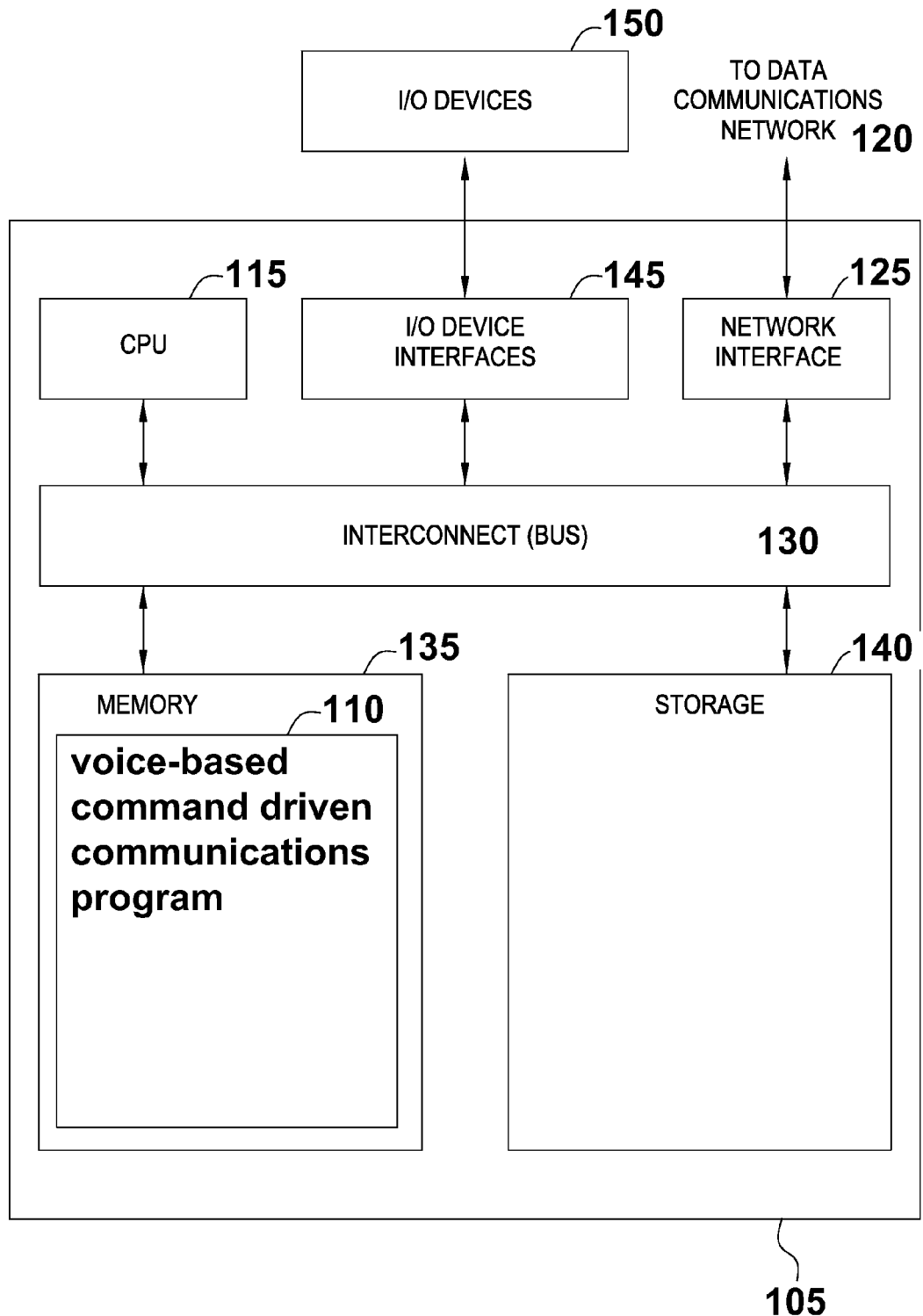

VOICE-BASED COMMAND DRIVEN COMPUTER IMPLEMENTED METHOD

CROSS-REFERENCE TO RELATED APPLICATIONS

This application claims benefit of U.S. Provisional Patent Application Ser. No. 61/303,771, filed Feb. 12, 2010, which is herein incorporated by reference.

BACKGROUND OF THE INVENTION

1. Field of the Invention

Embodiments of the present invention generally relate to a voice-based command driven computer implemented method and media that allows users to easily add any open application programming interface (API) communication product they choose to one interface.

2. Description of the Related Art

Today's consumers are inundated with different types of electronic communication such as e-mail on their computer, e-mail on their cell phone, instant messaging (IM) on their computer, IM and short message service (SMS) on their cell phone, Facebook updates, Twitter updates, voicemail, etc. Staying up to date and/or reading all of the electronic communication that one receives in a single day can consume a significant amount of time due to the need to physically interact with the electronic device and to read the electronic communication. Additionally, with the electronic communication coming from so many different sources, the user needs to interact with each of the multiple different sources, even if using a single device such as the cell phone or computer. Most consumers, however are tied to multiple communication devices (including both one-way and two-way communication devices) such as desktop computers, laptop computers, cell phones, landline phones, satellite radio, terrestrial radio, e-readers, etc.

This growing list of products and devices demands that users spend more time tied to technology and less time on other aspects of life. Therefore, there is a need to free the user to enjoy other aspects of life while permitting the user to remain actively engaged with their technology.

SUMMARY OF THE INVENTION

The present invention generally relates to a voice-based command driven computer implemented method that allows a user to easily consolidate any open API communication product they choose to one interface. The computer implemented method filters all electronic communications selected by the user through a common source, such as the user's cell phone or computer. It is to be understood that the computer implemented method may operate only over a cell phone without being installed on a desktop/laptop if desired. Each time an electronic communication is received, no matter through what program or application, the computer implemented method operates to communicate to the user that the electronic communication has been received and provides the user with the option of listening to and responding to the electronic communication, if appropriate. The user responds to the electronic communication through voice-based communication rather than physical interaction with the common source. It is to be understood that the user does have the option to response via the device, such as when the user is in a meeting, so that the device permits the user to reply at a later time. The user may additionally initiate electronic communication through voice-based communication.

In one embodiment, a computer implemented method includes receiving electronic data through an electronic device, issuing an audible notification through the electronic device that the electronic data has been received, receiving a first voice-based command to process the electronic data and issuing an audible presentation of the electronic data from the electronic device in response to the first voice-based command.

In another embodiment, a computer implemented method includes receiving a plurality of emails from a plurality of email accounts through an electronic device, issuing an audible notification through the electronic device that the plurality of emails has been received, receiving a first voice-based command to begin an audible presentation of the plurality of emails and issuing an audible presentation of the plurality of emails from the electronic device in response to the first voice-based command. The audible notification may occur at a predetermined time throughout the day or when a Bluetooth connection is detected.

In another embodiment, a computer implemented method includes receiving, in an electronic device, a voice-based command to place an emergency phone call, the voice-based command containing a trigger word or trigger phrase. The method also includes initiating and placing an emergency phone call, with the electronic device, in response to the voice-based command and without physical interaction with the source of the voice-based command. The method additionally includes issuing an audible statement from the electronic device regarding the emergency phone call.

In another embodiment, a computer-readable storage medium storing an application, which, when executed on a processor, performs an operation for a voice-based command driven computer implemented method, is disclosed. The operation comprises receiving electronic data through the processor in an electronic device, issuing an audible notification from the electronic device that the electronic data has been received, receiving a first voice-based command through the processor to process the electronic data and issuing an audible presentation of the electronic data from the electronic device in response to the first voice-based command.

In another embodiment, a system comprises a processor and a memory storing an application, which, when executed on the processor, performs an operation for a voice-based command driven computer implemented method. The operation comprises receiving electronic data through the processor, issuing an audible notification from the system that the electronic data has been received, receiving a first voice-based command through the processor to process the electronic data and issuing an audible presentation of the electronic data from the system in response to the first voice-based command.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 shows a management system 105 according to one embodiment.

DETAILED DESCRIPTION

The present invention generally relates to a voice-based command driven computer implemented method that allows a user to easily add any open API communication product they choose to one interface. The computer implemented method filters all electronic communications selected by the user through a common source, such as the user's cell phone or computer. Each time an electronic communication is received, no matter through what program or application, the computer implemented method operates to communicate to the user that the electronic communication has been received and provides the user with the option of listening to and responding to the electronic communication, if appropriate. The user responds to the electronic communication through voice-based communication rather than physical interaction with the common source. It is to be understood that the user always does have the option to reply in the traditional manner via physical interaction with the electronic device. The user may additionally initiate electronic communication through voice-based communication.

The computer implemented methods discussed herein are used on a communications platform that represents a multi-generational leap in how people communicate. The computed implemented methods transform the way users receive, process, and send information. The embodiments discussed herein are for a voice-based, command-driven communications platform that allows users to easily add any open-API communication product they choose to one interface. The computer implemented method aggregates all in-bound communication, filters the communications according to preferences, audibly notifies the user of the communication over their smartphone or personal computer, then allows the user to decide if, when and how to respond. Users are able to reply verbally and let the computer implemented method manage the technology and deliver the message.

The computer implemented method performs location-based web searches, dials voice-initiated calls, and allows users to add a variety of other features (e.g., a web page reader that queues articles for later listening, Bluetooth integration with automobile navigation that allows users to verbally provide an address instead of having to manually type into the navigation system) to their core product. The computer implemented method gives users unprecedented freedom from technology by allowing them to untether from multiple devices and products, and the computer implemented method breaks new ground by allowing users to easily (and safely) communicate in one of the most underserved locations in our lives—the automobile.

The computer implemented method permits the user to know the moment they received an IM, email, voicemail, or some other online update and reply immediately. The computer implemented method also permits the user to clear out e-mail inboxes during a morning commute without texting or even touching their phone.

The computer implemented method is very beneficial to those in automobiles such as commuters, commercial drives, and road warriors. While in an automobile, there is only one option for communication, the cell phone, which is inefficient and dangerous, especially when used for typed communication. In fact, in late January 2010, the U.S. Department of Transportation announced a nationwide ban that prohibits all commercial drivers from texting while driving. The computer implemented method discussed herein provides the first hands-free and "eyes-free" communication solution that, at a minimum, allows the user to listen to and reply to incoming e-mail, generate outgoing e-mail, perform location-based web searches and listen to and update their social media message statuses.

The computer implemented method is built on open standards that allows independent developers to create add-ons. The computer implemented method monetizes via a one-time purchase or ongoing subscription fee (pricing model to be determined) of a mobile app and personal computer client, software add-ons, and search and advertising revenue. To be clear, the computer implemented method does not replace the personal computer, cell phone, or a variety of other devices and products. Rather, the computer implemented method simply eliminates the need to constantly interact and visually engage multiple devices for information while providing user with more of their most valuable asset—time.

FIG. 1 illustrates an example of management system 105 used to provide a voice-based command driven communications platform 110, according to one embodiment of the invention. As shown, the management system 105 includes, without limitation, a central processing unit (CPU) 115, a network interface 125, an interconnect 130, a memory 135, and storage 140. The computer system may also include an I/O device interface 145 connecting I/O devices 150 (e.g., keyboard, display and mouse devices) to the computer system.

In general, the CPU 115 retrieves and executes programming instructions stored in the memory 135. Similarly, the CPU 115 stores and retrieves application data residing in the memory 135. The interconnect 130 provides a communication path for transmitting programming instructions and application data between the CPU 115, I/O devices interface 145, storage 140, network interface 125, and memory 135. CPU 115 is included to be representative of a single CPU, multiple CPUs, a CPU having multiple processing cores, and the like. And the memory 135 is generally included to be representative of a random access memory. The storage 140 may be a hard disk drive or solid state storage device (SSD). Further, although shown as a single unit, the storage 140 may be a combination of fixed and/or removable storage devices, such as fixed disc drives, floppy disc drives, tape drives, removable memory cards, optical storage, network attached storage (NAS), or a storage area-network (SAN). Illustratively, the memory 135 stores a voice-based command driven communications program 110.

In order to operate the computer implemented method, an initial setup will require users to download and install either a mobile application (for smartphone use) or client software (for personal computer use) and create/register a log-in ID. Once installation and registration are complete, the user sets their preferences in the processor of the device running the computer implemented method. Mobile users may configure their preferences either via their smartphone or logging in via PC.

In order to set the preferences for the computer implemented method, the user enters his/her personal information (e.g., home/work address, gender) and ties in one or more e-mail addresses, IM, Twitter and Facebook identities. The user also sets preferences such as: the times of day the computer implemented method should audibly notify the user of incoming communication, exceptions to time preferences, how often the computer implemented method should notify of messages waiting, vocal preference (i.e., male or female voice), communication inputs to monitor (e.g., e-mail, IM, Facebook), which friends or colleagues the computer implemented method should monitor for incoming electronic communications, filters for message length (i.e., word count) or content (i.e., specific words or foul language), custom alarm clock, web page reader, reminders, and podcasts with the option to play at custom times. The user also performs voice and sound checks to ensure the microphone and speakers are working correctly, and logs a voice-print ID (e.g., "The quick brown fox jumps over the lazy dog" pangram) and password for the computer implemented method's security related features.

When an incoming IM, email, etc. arrives on an electronic device such as a smartphone or computer, the computer implemented method informs the user via an audible notification. The user then decides whether to listen to the incoming electronic communication. If the user wants to hear the electronic communication, the user issues an audible (i.e., voice-based) command that is received by the processor of the electronic device. The processor then causes the electronic device to issue an audible presentation of the electronic data whereby the electronic communication is read aloud to the user without any physical contact with the electronic device and without the user ever needing to make eye contact with the electronic device. The user may even reply to the electronic communication by speaking the response (i.e., issuing an audible command) that is received by the processor of the electronic device. The processor then translates the audible response into text or electronic data and sends the reply.

The computer implemented method also functions in response to an audible command from the user even if no electronic communication has been received. For example, the user can simply issue an audible command (e.g., find nearest Italian restaurant) and the computer implemented method will operate to determine the location of the nearest Italian restaurant. The processor performs a search based upon GPS coordinates of the electronic device that are automatically detected. The processor then delivers the results to the user by issuing an audible notification. The processor can then send directions for the Italian restaurant to the user's specified account (e.g., email, SMS link, etc.) If desired, the computer implemented method can permit targeted audio ads to be delivered to the user based upon GPS location or home address.

If the electronic data is too long for the user, the user may issue an audible command to the electronic device to stop audibly delivering the electronic data and instead provide a word count. Should the user feel it is necessary, the user can simply issue an audible command to the electronic device to ignore or skip the electronic data and add a reminder to review the electronic data at a later time. Additionally, the user can issue an audible command to the electronic device to place a call if desired.

If desired, the user can audibly command the electronic device to not deliver any electronic data for a period of time determined by the user. The user could also issue an audible command to the electronic device to function as an alarm clock and provide an audible sound at a time specified by the user. The user can respond to the audible sound by providing an audible command to turn off the alarm or to snooze for a specified period of time.

The computer implemented method may be used in numerous situations such as when the user is under duress. Prior to the duress situation, the user sets up default settings, including a trigger word or trigger phrase that may be spoken by the user in a time of duress to initiate an emergency call by the electronic device to the proper authorities without the user ever touching or looking at the electronic device. The electronic device, once it receives the trigger word or phrase, will auto-dial emergency services (e.g., 9-1-1), inform the dispatch operator that the user is in an emergency situation, and give the user's GPS coordinates. The electronic device will then go into speaker mode so the dispatch operator can hear what's going on and the user can be comforted that help is on the way.

The computer implemented method has the ability to pause a task, such as audibly presenting headlines from a webpage or a news feed (e.g., RSS) selected by the user, to permit the user to make and/or receive an electronic communication such as a telephone call, text or email. Once the electronic communication is over, the audible presentation of the headlines resumes.

The computer implemented method also can catalog information from webpages or other data sources (e.g., RSS) visited to then audibly present the information from the selected webpages to the user at a selected time. Thus, the user may listen to the content at a later time and not miss important information.

The computer implemented method will also have the ability to initiate a silent or audible alarm call to emergency services based on the user manually pushing a red "ALARM" button on the top of a docking station. Three button presses (with less than one second between each press) can sound an audible alarm; six button presses will sound a silent alarm. It is to be understood that more or less button presses may be utilized based upon the user's preferences. Any user authorized for the account (e.g., family member) will be able to deactivate a security alarm (that has not already connected with emergency services) by providing a password. Users may create two passwords: one is a valid password that cancels the alarm (which may also be the same general password they use for the product); the other indicates the user is under duress and notifies emergency services that the user is under duress.

The computer implemented method also has robust controls that allow parents to monitor their children's activities in and outside the home. Parents will be able to set time limits and access controls for the computer implemented method, and receive reports about phone calls, e-mail and instant messages sent/received. Parents will also be able to copy their children on the report as a reminder that their activity is being monitored.

For a family setting, the computer implemented method can be arranged to set the individual limitations for children. Each child will have a unique password but a parent can still access his account. Parents will be able to receive daily, weekly or on-demand reports for each child, and they will have the ability to approve/disapprove specific web sites and interaction with other users via e-mail notifications.

The computer implemented method permits the electronic device to function as an intercom for direct communication with other electronic devices within a home network or as a monitor for one way communication with other electronic devices within a home network.

The computer implemented method has numerous privacy features. For example, if a docking station is used, the docking station can be muted or suspended for a specified period of time. The docking station can be secured so it cannot be accessed without a verbal or typed (for networked versions) password, or an authorized and paired Bluetooth-enabled smartphone. The computer implemented method can be set to allow or deny incoming messages from a particular sender (or calls if based on the caller ID information passed to docking stations with RJ11 jacks) either any time of day or at specific hours. The computer implemented method can be set to allow incoming messages from a particular sender, or all senders, if set as "urgent" priority.

It is also envisioned that the computer implemented method can be set so that the user can receive notifications of incoming messages at all docking stations, one specific station, or several specific stations, auto-route messages from a particular sender to a specific station, mute all stations (i.e., turn off all microphones) for a specified number of minutes or hours, or until an incoming message arrives, and suspend all stations (i.e., turn off all functionality) for a specified number or minutes or hours, or until an incoming message arrives.

Because the user's smartphones can be connected to a car's Bluetooth audio system, all audio communication between user and the smartphone can be routed through the car's speakers and microphone. Thus, while driving, the user can be both hands free and eyes free to permit the user to drive safely. The user will be able to listen to all desired electronic data that time permits as well as respond to electronic communications while driving the car without ever looking at or touching the smartphone. The user can even update social media sites (or other, future open-API products) while driving the car. Similarly, the user can hear information from selected social media sites or websites while driving the car.

The computer implemented method may be used on the electronic device, but may interact with hardware that is either directly or wirelessly connected to the electronic device. For example, home or office users who want high-quality audio or want increased mobility and convenience will be able to use hardware such as wireless (or hard-wired) docking stations. The wireless docking stations, which look like a large desktop computer speaker, contain a high quality microphone and speakers, can automatically "dock" to the user's smartphone via Bluetooth when it is placed within a few feet of the docking station, and can contain a cordless charging station. Additional features for the docking station include a "mute" button to disable the microphone, a "Bluetooth" button to indicate an adequate connection between phone and station, and an "Alarm" button on top to activate the computer implemented method's emergency mode that auto-dials and conferences in the police or fire departments.

The docking stations may contain connectivity features to network multiple stations in the home or office, allowing the computer implemented method to automatically route communications via the station that is closest in proximity to the user. These networked docking stations may also contain one or more of the following: webcam, clock, RJ45 jack, RJ11 jack, USB ports, and alarm system hardware (e.g., motion sensor, door/window, smoke alarm) interfaces. Additional hardware accessories that are envisioned include remote microphones, which are wireless microphones that link a user to one or more docking stations, and is used in lieu of carrying their smartphone to every room. Remote microphones are worn on the person (e.g., as a lapel pin, pendant or wristband), and allow the user to provide high-quality voice input where background noise or distance to a docking station might degrade the voice signal.

By having a computer implemented method that operates based upon audible communications from the user, the user is able to obtain information in both hands free and eyes free manner. The computer implement methods discussed herein permit a user to maximize their efficiency by allowing the user to access information that they would normally receive visually in an audible manner. Thus, the user is free to drive an automobile or even prepare dinner without any need to touch or look at the electronic device providing the information.

While the foregoing is directed to embodiments of the present invention, other and further embodiments of the invention may be devised without departing from the basic scope thereof, and the scope thereof is determined by the claims that follow.

The invention claimed is:

1. A computer implemented method, sequentially comprising:
    receiving email through a processor in an electronic device;
    processing the email in the processor in the electronic device, wherein the processing comprises converting the email into an audible notification;
    issuing the audible notification from the electronic device that the email has been received;
    receiving a first voice-based command through the processor to process the email;
    issuing a first audible presentation of the email from the electronic device in response to the first voice-based command;
    receiving a second voice-based command through the processor to stop issuing the first audible presentation of the email;
    stopping the first audible presentation in response to receiving the second voice-based command, wherein the first audible presentation has not completed at the time the stopping occurs;
    calculating a word count of the total number of words in the email for the first audible presentation and providing the word count;
    receiving a third voice-based command through the processor to add a reminder to review the first audible presentation at a later time;
    receiving a fourth voice-based command through the processor to skip to a second audible presentation;
    issuing the second audible presentation of email that is different from the first audible presentation, wherein the first audible presentation has not completed at the time the second audible presentation is issued; and
    receiving a fifth voice-based command through the processor to withhold delivery of all email for a specified period of time.

2. The method of claim 1, wherein the electronic device is a cell phone.

3. A non-transitory computer-readable storage medium storing an application, which, when executed on a processor, performs an operation for a voice-based command driven computer implemented method, the operation sequentially comprising:
    receiving email through a processor in an electronic device;
    processing the email in the processor in the electronic device, wherein the processing comprises converting the email into an audible notification;
    issuing the audible notification from the electronic device that the email has been received;
    receiving a first voice-based command through the processor to process the email;
    issuing a first audible presentation of the email from the electronic device in response to the first voice-based command;
    receiving a second voice-based command through the processor to stop issuing the first audible presentation of the email;
    stopping the first audible presentation in response to receiving the second voice-based command, wherein the first audible presentation has not completed at the time the stopping occurs;

calculating a word count of the total number of words in the email for the first audible presentation and providing the word count;

receiving a third voice-based command through the processor to add a reminder to review the first audible presentation at a later time;

receiving a fourth voice-based command through the processor to skip to a second audible presentation;

issuing the second audible presentation of email that is different from the first audible presentation, wherein the first audible presentation has not completed at the time the second audible presentation is issued; and receiving a fifth voice-based command through the processor to withhold delivery of all email for a specified period of time.

4. The non-transitory computer-readable storage medium of claim 3, wherein the electronic device is a cell phone.

5. A system, comprising:

a processor; and a memory storing an application, which, when executed on the processor, performs an operation for a voice-based command driven computer implemented method, the operation sequentially comprising:

receiving email through the processor;

processing the email in the processor in the electronic device, wherein the processing comprises converting the email into an audible notification;

issuing the audible notification from the system that the email has been received;

receiving a first voice-based command through the processor to process the email;

issuing an audible presentation of the email from the system in response to the first voice-based command;

receiving a second voice-based command through the processor to stop issuing the first audible presentation of the email;

stopping the first audible presentation in response to receiving the second voice-based command, wherein the first audible presentation has not completed at the time the stopping occurs;

calculating a word count of the total number of words in the email for the first audible presentation and providing the word count;

receiving a fourth voice-based command through the processor to add a reminder to review the first audible presentation at a later time;

receiving a fourth voice-based command through the processor to skip to a second audible presentation;

issuing the second audible presentation of email that is different from the first audible presentation, wherein the first audible presentation has not completed at the time the second audible presentation is issued; and receiving a fifth voice-based command through the processor to withhold delivery of all email for a specified period of time.

* * * * *